United States Patent
Arima

(10) Patent No.: US 9,964,181 B2
(45) Date of Patent: May 8, 2018

(54) VEHICLE GEAR-TYPE SPEED CHANGER AND MOTORCYCLE SPEED REDUCER

(71) Applicant: KAWASAKI JUKOGYO KABUSHIKI KAISHA, Hyogo (JP)

(72) Inventor: Hisatoyo Arima, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 271 days.

(21) Appl. No.: 14/812,236

(22) Filed: Jul. 29, 2015

(65) Prior Publication Data

US 2016/0053860 A1 Feb. 25, 2016

(30) Foreign Application Priority Data

Aug. 19, 2014 (JP) .................................. 2014-166465

(51) Int. Cl.
  *F16H 3/08* (2006.01)
  *F16H 3/089* (2006.01)
  *F16H 57/02* (2012.01)

(52) U.S. Cl.
  CPC ............. *F16H 3/089* (2013.01); *F16H 57/02* (2013.01); *F16H 2200/0039* (2013.01)

(58) Field of Classification Search
  CPC ..................... F16H 37/021; F16H 2003/0931
  USPC ........................... 74/325, 330, 331, 333, 340
  See application file for complete search history.

(56) References Cited

U.S. PATENT DOCUMENTS

| | | | |
|---|---|---|---|
| 4,427,088 A * | 1/1984 | Tsuboi | F02B 61/02 180/219 |
| 4,509,381 A | 4/1985 | Ikemoto et al. | |
| 5,501,292 A * | 3/1996 | Kawashima | B62K 25/283 180/220 |
| 5,830,099 A | 11/1998 | Forsyth | |
| 6,595,078 B2 * | 7/2003 | Arakawa | F16H 3/089 74/337.5 |
| 7,987,739 B2 * | 8/2011 | Okadome | F16H 3/093 74/331 |
| 2011/0041636 A1 | 2/2011 | Matsumoto | |
| 2012/0240701 A1 * | 9/2012 | Matsuda | F16D 11/14 74/333 |

FOREIGN PATENT DOCUMENTS

| | | |
|---|---|---|
| JP | 58-113659 | 7/1983 |
| JP | 2009-243657 | 10/2009 |
| JP | 2011-112197 | 6/2011 |

* cited by examiner

*Primary Examiner* — Ha Dinh Ho
(74) *Attorney, Agent, or Firm* — Wenderoth, Lind & Ponack, L.L.P.

(57) ABSTRACT

Out of a plurality of speed change gears on one of an input shaft and an output shaft, for example, on the output shaft, two adjacent speed change gears disposed via an axial space therebetween are axially fixed and rotatably fitted around the output shaft. A dog ring for a dog clutch disposed between the speed change gears is fixed around the output shaft and axially slidably fitted thereto. The speed change gears on the output shaft and the dog ring are each provided with an engagement portion for the dog clutch engaged and disengaged by axial shift of the dog ring. The two speed change gears on the input shaft meshing with the two speed change gears on the output shaft are provided integrally with the input shaft.

6 Claims, 3 Drawing Sheets

VEHICLE GEAR-TYPE SPEED CHANGER AND MOTORCYCLE SPEED REDUCER

BACKGROUND OF THE INVENTION

1. Field of the Invention

The present invention relates to a vehicle gear-type speed changer and a motorcycle speed reducer. The present invention particularly relates to a vehicle gear-type speed changer and a motorcycle speed reducer which include a dog ring for a dog clutch configured to switch on and off transmission of power between a shaft and a speed change gear.

2. Description of the Related Art

A gear-type speed changer including a dog ring for a dog clutch is configured to lock a plurality of speed change gears so as to be axially unslidable and axially shift the dog ring, so as to change to a desired speed level (JP 2011-112197 A).

In the conventional structure disclosed in JP 2011-112197 A, only a first-level speed change gear having the minimum diameter is provided integrally with an input shaft on the input shaft and the remaining speed change gears are provided separately from the input shaft. This structure accumulates axial dimensional errors among the speed change gears during production and assembly. It is thus difficult to improve axial dimensional accuracy among the speed change gears.

SUMMARY OF THE INVENTION

In view of the above, an object of the present invention is to improve accuracy in production and assembly of a speed change gear provided on a shaft in a vehicle gear-type speed changer or a motorcycle speed reducer including a dog ring.

In order to achieve the object mentioned above, the present invention provides a vehicle gear-type speed changer including an input shaft including a plurality of input speed change gears, and an output shaft including a plurality of output speed change gears meshing with the plurality of input speed change gears and disposed parallelly to the input shaft, wherein out of the plurality of speed change gears on a first one of the input shaft and the output shaft, the two adjacent speed change gears via an axial space therebetween are axially fixed and rotatably fitted around the first shaft, and a dog ring for a dog clutch disposed between the two adjacent speed change gears is fixed around the first shaft and axially slidably fitted thereto, the two speed change gears and the dog ring on the first shaft are each provided with an engagement portion for the dog clutch engaged and disengaged by axial shift of the dog ring, and the two speed change gears on a second one of the shafts meshing with the two speed change gears on the first shaft are provided integrally with the second shaft.

The present invention can preferably adopt any of the following configurations.

(a) The speed change gears meshing with each other form at least three speed change gear pairs, out of the speed change gear pairs, the second shaft is integrally provided with a first speed change gear disposed on the second shaft and forming a first speed change gear pair with a largest speed change ratio, and a second speed change gear disposed on the second shaft and forming a second speed change gear pair with a second largest speed change ratio, and the speed change gear disposed on the second shaft and forming the remaining speed change gear pair is spline fitted to an outer circumferential surface of the second shaft.

(b) In the configuration (a), a third speed change gear is disposed opposite to the first speed change gear with respect to the second speed change gear, and the third speed change gear is spline fitted to the outer circumferential surface of the second shaft and has an axially end surface at an inner circumferential end, and the axially end surface is axially in contact with a teeth root of the second speed change gear.

(c) In the configuration (b), a fourth speed change gear is disposed opposite to the second speed change gear with respect to the third speed change gear, and the fourth speed change gear is spline fitted to the outer circumferential surface of the second shaft and has an axially end surface at an inner circumferential end, and the axially end surface is axially in contact with the inner circumferential end of the third speed change gear.

(d) In the configuration (b) or (c), the third speed change gear has an inner circumferential surface including a spline portion spline fitted to the second shaft and a fitting portion interference fitted to the outer circumferential surface, not provided with the spline portion, of the second shaft.

(e) In one of the configurations (b) to (d), the second shaft has a portion between the first speed change gear and the second speed change gear, and the portion has an axial diameter smaller than a major diameter of outer circumferential spline teeth of the second shaft spline fitted to the third speed change gear.

The present invention also provides a motorcycle speed reducer including the vehicle gear-type speed changer according to any one of the above configurations, wherein the motorcycle speed reducer has at least three speed levels, the second shaft corresponds to the input shaft configured to receive power from a rotation drive source, the first shaft corresponds to the output shaft configured to transmit the power to a driving wheel, and the two speed change gears provided integrally with the input shaft are lower first-level and second-level speed change gears.

(1) The adjacent speed change gears via the dog ring on the first shaft have an axial space therebetween to secure an axial width and a shift distance of the dog ring. Correspondingly, the two speed change gears on the second shaft meshing with the speed change gears on the first shaft have an axial space therebetween. The two speed change gears on the second shaft are provided integrally with the second shaft in the present invention. This configuration reduces accumulative axial errors between the speed change gears during production and assembly, to improve axial dimensional accuracy between the speed change gears and prevent axial displacement of the speed change gears.

(2) The two speed change gears on the second shaft meshing with the adjacent speed change gears on the first shaft are provided integrally with the second shaft with the axial space therebetween. Accordingly, interference between a teeth forming tool such as a hob and the nearby speed change gear is prevented during gear cutting of the speed change gears on the second shaft, and the two speed change gears are easily provided integrally with the shaft.

(3) The two speed change gears are provided integrally with the single shaft. This structure reduces the number of gear components.

(4) As compared to a structure in which a shaft and speed change gears provided thereto are formed separately, this structure prevents backlash, friction, and the like between the gears and the shaft.

(5) The configuration (a) achieves reduction in gear diameter and increase in speed change ratio as compared to a case where the first and second speed change gears are spline fitted to the second shaft.

(6) The configuration (b) prevents axial displacement of the second speed change gear provided integrally with the shaft. This configuration achieves reduction in axial space between teeth of the second and third speed change gears and increase in axial width of the second or third speed change gear. This configuration accordingly achieves increase in torque transmission capacity between the speed change gears.

(7) The configuration (c) achieves torque transmission with the shaft using the fourth speed change gear so as to compensate limitation at a spline fitting portion of the third speed change gear. Furthermore, the space between the third and fourth speed change gears is regulated with no provision of a spacer therebetween separately from the speed change gears.

(8) The configuration (d) causes the third speed change gear to be fixed to the shaft by both of press fitting and spline fitting. This configuration improves accuracy in attaching the third speed change gear to the shaft and its joint degree. This configuration improves torque transmission as compared to a configuration only with spline fitting.

(9) The configuration (e) reduces the outer diameters of the lower first-level and second-level speed change gears with no reduction in teeth height thereof, to achieve increase in lower speed reduction ratio.

(10) The motorcycle speed reducer described above increases setting flexibility of the lower speed reduction ratio. Specifically, the input first-level and second-level speed change gears are reduced in diameter without thinning the input shaft and the lower speed reduction ratio is increased, to improve acceleration of the vehicle.

DETAILED DESCRIPTION OF THE INVENTION

Figure 1:
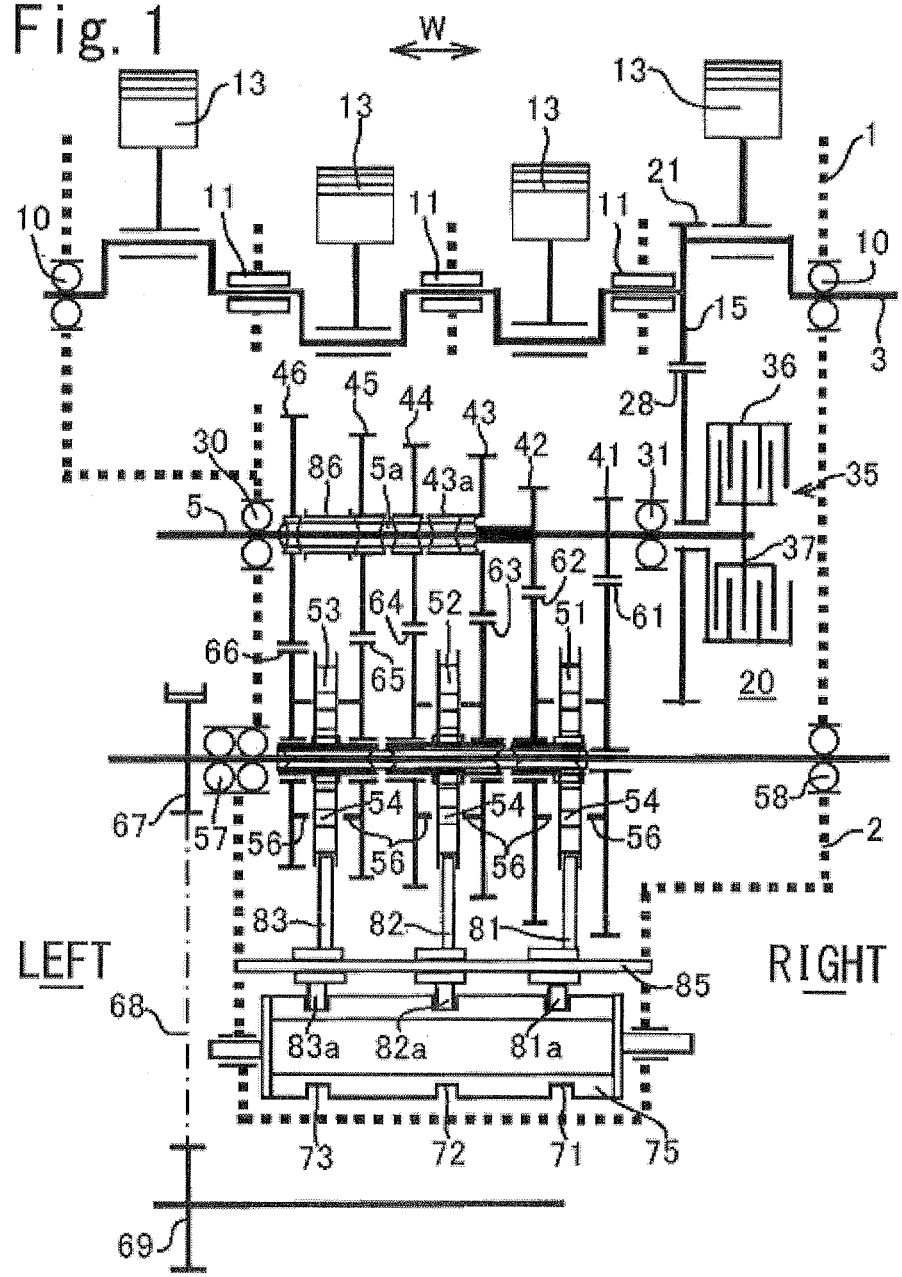
FIG. 1 is a brief sectional view taken along a plane including axes of a vehicle gear-type speed changer and an engine in a neutral state according to the present invention.
Figure 2:
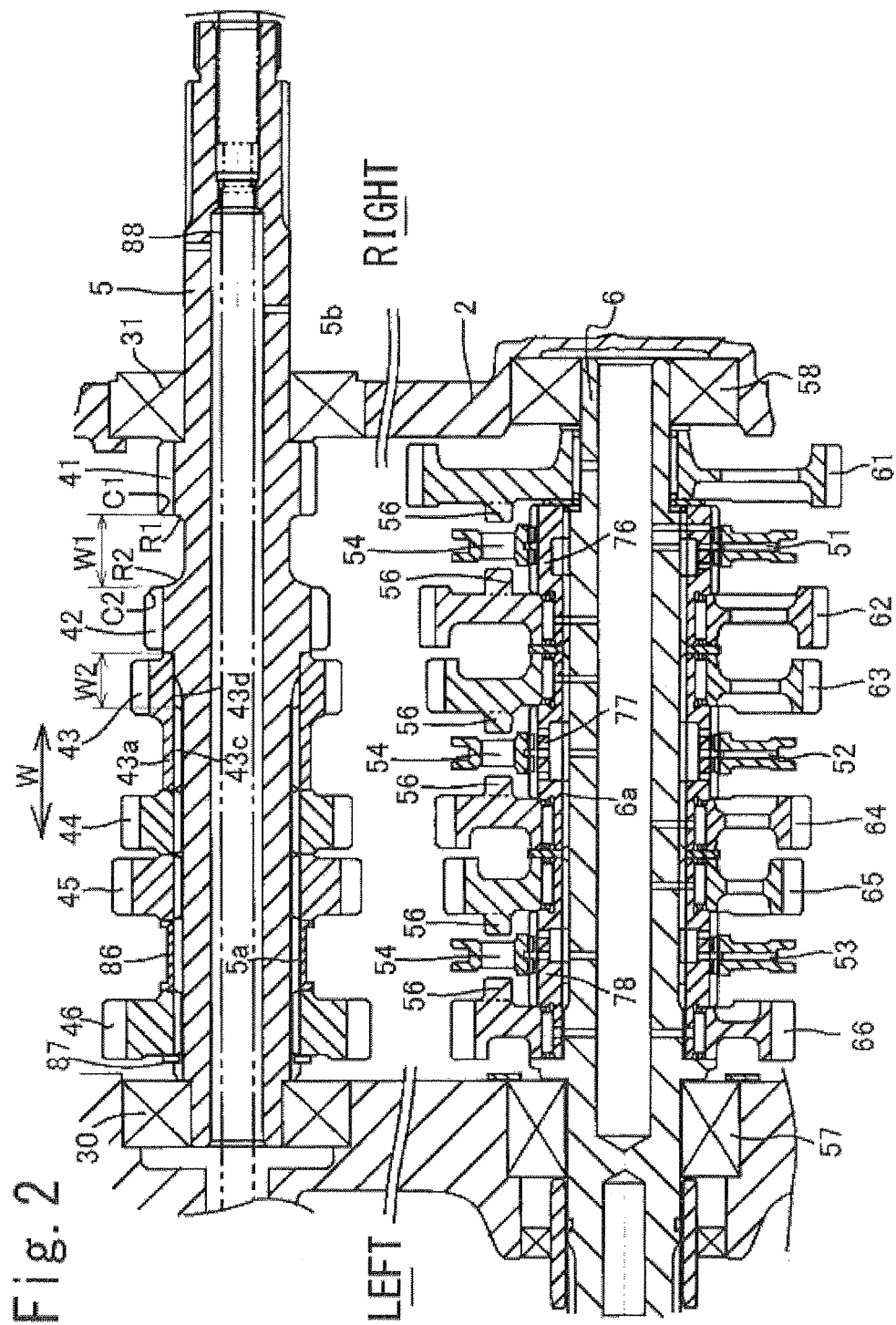
FIG. 2 is an enlarged sectional view of the vehicle gear-type speed changer depicted in FIG. 1.
Figure 3:
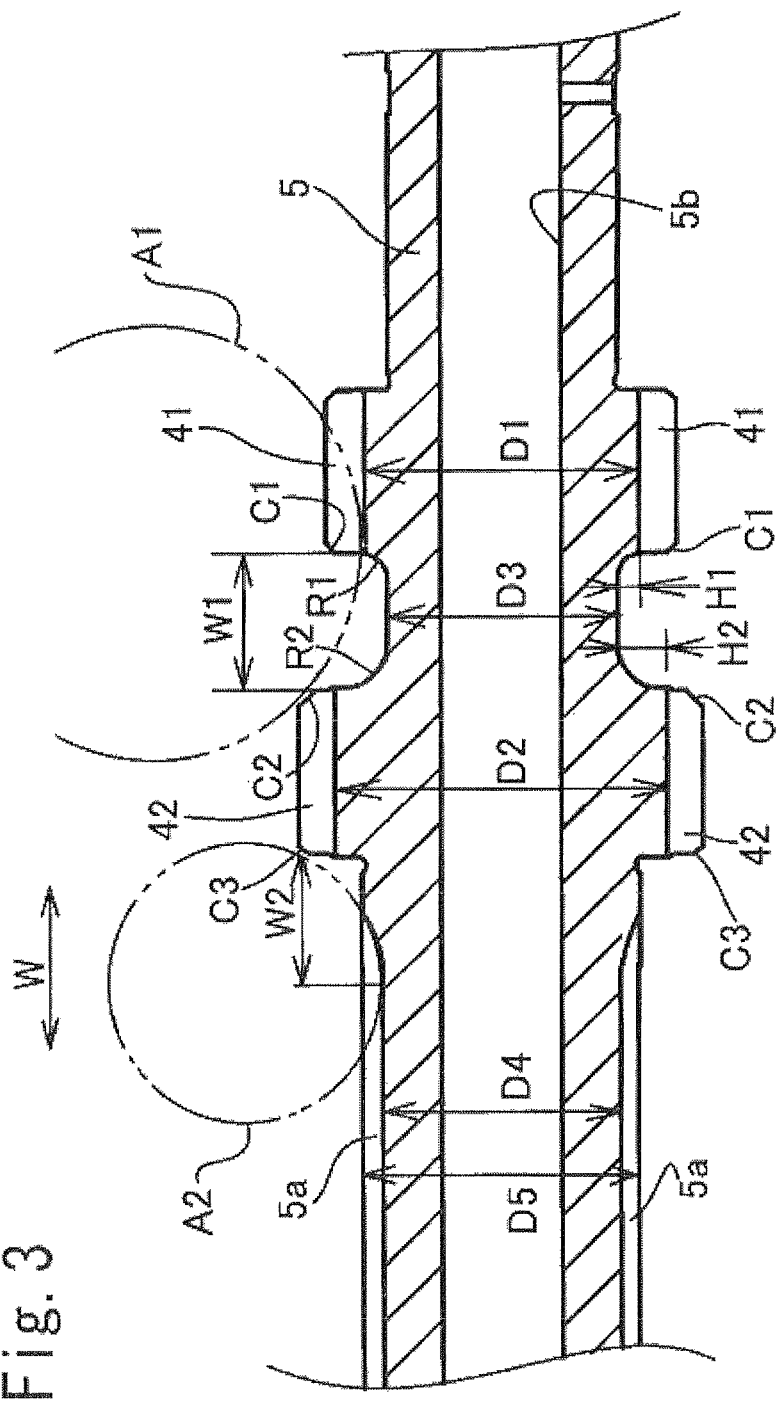
FIG. 3 is a partially enlarged sectional view of an input shaft of the vehicle gear-type speed changer depicted in FIG. 1.

FIGS. 1 to 3 each depict a motorcycle gear-type speed changer according to an embodiment of the present invention. The present invention will now be described with reference to these figures. Each of the figures includes an arrow W indicating the vehicle width direction of the motorcycle. Left and right sides of a rider of the vehicle are assumed as left and right sides of the vehicle.

With reference to FIG. 1, an engine E can have four cylinders, and includes a crankcase 1 and a speed changer case 2 provided integrally with and disposed behind the crankcase 1. The crankcase 1 accommodates a crank shaft 3 extending in a vehicle width direction W, whereas the speed changer case 2 accommodates a speed change input shaft 5 and a speed change output shaft 6 each disposed parallelly to the crank shaft 3.

The crank shaft 3 is rotatably supported by the crankcase 1 via a plurality of bearings 10 and 11, and each crank pin is linked to a piston 13 of a corresponding one of the cylinders via a connecting rod. A second crank web 15 from the right end of the crank shaft 3 is integrally provided, on the outer peripheral surface, with a crank gear 21.

The input shaft 5 has the left and right ends supported by bearings 30 and 31 so as to be rotatable relatively to the speed changer case 2. The input shaft 5 is provided thereon with a first-level speed change gear 41, a second-level speed change gear 42, a third-level speed change gear 43, a fourth level speed change gear 44, a fifth-level speed change gear 45, and a sixth-level speed change gear 46 for power input. These speed change gears 41 to 46 are disposed in the order mentioned above from the right end. The input first-level to sixth-level speed change gears 41 to 46 are aligned from the right end to the left end with their outer diameters increasing gradually. The six input speed change gears 41 to 46 are each axially unshiftable relatively to the input shaft 5 as well as unrotatable relatively to the input shaft 5, so as to constantly rotate together or integrally with the input shaft 5.

The right end of the input shaft 5 projects into a clutch chamber 20. The projecting right end is provided with a multiplate friction clutch 35, and a clutch gear 28 is fitted to the projecting right end so as to freely idle. The clutch gear 28 meshes with the crank gear 21 and is joined to an input outer case (clutch housing) 36 of the clutch 35. The clutch 35 has an output inner hub 37 firmly fixed to the input shaft 5. The outer case 36 and the inner hub 37 are switchably connected via a large number of friction plates.

The output shaft 6 has the left and right ends supported by bearings 57 and 58 so as to be rotatable relatively to the speed changer case 2. The output shaft 6 is provided thereon with a first-level speed change gear 61, a second-level speed change gear 62, a third-level speed change gear 63, a fourth-level speed change gear 64, a fifth-level speed change gear 65, and a sixth-level speed change gear 66 for power output. These speed change gears 61 to 66 are disposed in the order mentioned above from the right end, and constantly mesh with the input first-level to sixth-level speed change gears 41 to 46, respectively. The output first-level to sixth-level speed change gears 61 to 66 are aligned from the right end to the left end with their outer diameters decreasing gradually. The six output speed change gears 61 to 66 are each axially unshiftable relatively to the output shaft 6 but can freely idle relatively to the output shaft 6.

The left end of the output shaft 6 projects out of the speed changer case 2, and an output sprocket wheel 67 is firmly fixed to the projecting left end. The output sprocket wheel 67 is linked to a rear wheel sprocket wheel 69 via a driving chain 68.

First to third dog-clutch dog rings 51 to 53 are provided, on the output shaft 6, axially between the output first-level and second-level speed change gears 61 and 62, axially between the output third-level and fourth-level speed change gears 63 and 64, and axially between the output fifth-level and sixth-level speed change gears 65 and 66, so as to be axially shiftable and integrally rotatable relatively to the output shaft 6.

The dog rings 51 to 53 are each provided with a plurality of engagement holes 54 circumferentially spaced apart from each other. The output speed change gears 61 to 66 are provided, on axially end surfaces, with engagement projections 56 projecting toward the adjacent dog rings 51 to 53 and engageable with the engagement holes 54, respectively, to configure three dog clutches.

An operation mechanism configured to axially shift the dog rings 51 to 53 includes a shift cam drum 75 having three cam grooves 71 to 73, first to third shift folks 81 to 83 having drive pins engaged with the cam grooves 71 to 73, respectively, and a shift shaft 85 axially shiftably supporting the shift folks 81 to 83. The shift cam drum 75 and the shift shaft 85 are disposed parallelly to the output shaft 6 and the input shaft 5. The shift folks 81 to 83 have folk claws engaged with annular grooves provided on the outer circumferences of the dog rings 51 to 53, respectively.

The shift cam drum 75 is configured similarly to an ordinary drum operation mechanism for a motorcycle and is linked to a gear shift pedal (not depicted) via an operation power transmission mechanism (not depicted) such as a gear shift arm mechanism. The shift cam drum 75 is rotated with every predetermined rotation amount by stepping on or pulling upward the gear shift pedal, to axially shift the shift folks 81 to 83 via the cam grooves 71 to 73 and axially shift the dog rings 51 to 53 selectively.

The structures of the output speed change gears 61 to 66 and the input speed change gears 41 to 46 will be described in detail with reference to FIG. 2. In the output first-level to sixth-level speed change gears 61 to 66, the first-level speed change gear 61 disposed at the axially rightmost end is fitted so as to freely idle, to the outer circumferential surface of the output shaft 6 via a needle bearing directly. The output shaft 6 is provided, on the outer circumferential surface in the range from the left end of the fitted portion with the first-level speed change gear 61 to the vicinity of the left bearing 57, with outer circumferential spline teeth 6a. Spline fitted to the outer circumferential spline teeth 6a are three barrels 76 to 78 having inner circumferential spline teeth. To the outer circumferential surface of the right barrel 76, the first dog ring 51 is spline fitted so as to be axially shiftable and the second-level speed change gear 62 is fitted so as to freely idle via a needle bearing. To the outer circumferential surface of the axially middle barrel 77, the second dog ring 52 is spline fitted so as to be axially shiftable and the third-level and fourth-level speed change gears 63 and 64 are each fitted so as to freely idle via a needle bearing. To the outer circumferential surface of the left barrel 78, the third dog ring 53 is spline fitted so as to be axially shiftable and the fifth-level and sixth-level speed change gears 65 and 66 are each fitted so as to freely idle via a needle bearing. The output speed change gears 61 to 66 are axially unshiftably locked by circumferential ends of the barrel 76 to 78.

In the input first-level to sixth-level speed change gears 41 to 46, the first-level speed change gear 41 disposed at the axially rightmost end and the second-level speed change gear 42 as the second one from the right end are disposed with a first predetermined space W1 in the axial direction and are provided integrally with the input shaft 5. The input first-level and second-level speed change gears 41 and 42 each have outer circumferential gear teeth that are gear cut by a gear hobbing machine or the like. The input shaft 5 is provided, on the outer circumferential surface in the range from the position axially distant leftward by a second predetermined space W2 from the left end of the second-level speed change gear 42 to the vicinity of the left bearing 30, with outer circumferential spline teeth 5a having an uniform major diameter. Spline fitted to the outer circumferential spline teeth 5a are the input third-level to sixth-level speed change gears 63 to 66 having inner circumferential spline teeth. The input shaft 5 is provided, at the axial portion, with an axial hole 5b through which a release rod (virtual line) 88 for a clutch release is inserted.

The input third-level speed change gear 43 is integrally provided, at the inner circumferential end (teeth root), with an extending boss 43a extending axially leftward. The third-level speed change gear 43 is provided, on the inner circumferential surface, with a spline portion 43c having inner circumferential spline teeth and a fitting portion 43d provided with no inner circumferential spline teeth. The fitting portion 43d is provided in an axial range substantially corresponding to the second predetermined space W2 not provided with the outer circumferential spline teeth 5a of the input shaft 5. The spline portion 43c having the inner circumferential spline teeth is provided in the axial range other than the fitting portion 43d and substantially in the entire axial area of the extending boss 43a. The fitting portion 43d has an inner diameter slightly smaller than the axial diameter of the second predetermined space W2 so as to be interference fitted to the outer circumferential surface in the second predetermined space W2 of the input shaft 5. The outer circumferential surface in the second predetermined space W2 of the input shaft 5 is press fitted into the fitting portion 43d by constant pressure. In other words, in the entire axial width of the third-level speed change gear 43, the spline portion 43c provided substantially in the entire axial range of the extending boss 43a is spline fitted to the outer circumferential spline teeth 5a of the input shaft 5 whereas the remaining fitting portion 43d is interference fitted to the outer circumferential surface in the second predetermined space W2 of the input shaft 5.

The axially right end of the inner circumferential end of the input third-level speed change gear 43 is in contact with the axially left end of the teeth root of the second-level speed change gear 42, so as to position axially rightward the third-level speed change gear 43.

The axially right end of the inner circumferential end (teeth root) of the input fourth-level speed change gear 44 is in contact with the axially left end of the extending boss 43a of the third-level speed change gear 43, so as to position axially rightward the fourth-level speed change gear 44.

The axially right end of the inner circumferential end of the input fifth-level speed change gear 45 is in contact with the axially left end of the inner circumferential end of the fourth-level speed change gear 44, so as to position axially rightward the fifth-level speed change gear 45.

A cylindrical spacer 86 is provided between the input fifth-level speed change gear 45 and the sixth-level speed change gear 46 disposed at the leftmost end and is fitted to the outer circumferential surface of the input shaft 5. The axially right end of the spacer 86 is in contact with the axially left end of the inner circumferential end of the fifth-level speed change gear 45. The axially right end of the inner circumferential end of the sixth-level speed change gear 46 is in contact with the axially left end of the spacer 86. The sixth-level speed change gear 46 is thus positioned axially rightward.

The left end surface of the input sixth-level speed change gear 46 is locked by a locking ring (snap ring) 87. Accordingly, the sixth-level speed change gear 46 is positioned leftward, and the third-level to fifth-level speed change gears 43 to 45 are positioned leftward. The locking ring 87 is engaged with the outer circumferential annular groove of the input shaft 5 so as to be axially unshiftable.

At the spline fitting portion between the outer circumferential spline teeth 5a of the input shaft 5 and the inner circumferential spline teeth of each of the input third-level to sixth-level speed change gears 43 to 46, the major diameter (teeth tip circle diameter) of the outer circumferential spline teeth 5a of the input shaft 5 is set substantially equally to the bottom diameter (teeth bottom circle diameter) of the inner circumferential spline teeth of the third-level to sixth-level speed change gears 43 to 46 so as to be interference fitted by slight pressure. The interference fitting is made by smaller pressure (tension) than that of the interference fitting between the fitting portion 43d of the third-level speed change gear 43 and the second predetermined space W2 of the input shaft 5.

FIG. 3 is an enlarged sectional view of the right portion of the input shaft 5 by itself. A circular virtual line A1 indicates first hob teeth used for gear cutting the first-level speed change gear 41, a circular virtual line A2 indicates second hob teeth used for gear cutting the outer circumferential spline teeth 5a of the input shaft 5, and the second hob teeth A2 are smaller in outer diameter than the first hob teeth A1 and can have an outer diameter of about a half.

The first predetermined space W1 in the axial direction between the axially left end of the first-level speed change gear 41 and the axially right end of the second-level speed change gear 42 is set so that the first hob teeth A1 is displaced slightly rightward from the position where the first hob teeth A1 start interfering with the right end of the second-level speed change gear 42 upon completion of gear cutting (the state depicted in FIG. 2) at the left end of the first-level speed change gear 41 in the gear cutting of the first-level speed change gear 41 with the first hob teeth A1.

The second predetermined space W2 corresponding to the interference fitting portion in the outer circumferential surface of the input shaft 5 is set so that the second hob teeth A2 is displaced slightly leftward from the position where the second hob teeth A2 interfere with the left end of the second-level speed change gear 42 upon completion of processing (the state depicted in FIG. 2) at the right end of the outer circumferential spline teeth 5a in the gear cutting (spline processing) of the outer circumferential spline teeth 5a of the input shaft 5 with the second hob teeth A2.

The first predetermined space W1 between the teeth root of the first-level speed change gear 41 and the teeth root of the second-level speed change gear 42 in the input shaft 5 has an axial diameter D3 set to be smaller than a major diameter (teeth tip circle diameter) D5 of the outer circumferential spline teeth 5a of the input shaft 5, and in the present embodiment, be substantially equal to a minor diameter (teeth bottom circle diameter) D4 of the outer circumferential spline teeth 5a.

The first predetermined space W1 of the input shaft 5 is provided, at the axial ends, with a first round surface R1 connecting in an arc shape the left end surface of the first-level speed change gear 41 and the outer circumferential surface of the input shaft 5 and a second round surface R2 connecting in an arc shape the right end surface of the second-level speed change gear 42 and the outer circumferential surface of the input shaft 5. The second round surface R2 is larger in radius than the first round surface R1. In the present embodiment, the radius of the second round surface R2 is set to be about one and a half times to twice as large as the radius of the first round surface R1.

The first-level speed change gear 41 has a teeth bottom circle diameter D1 slightly smaller than the major diameter D5 of the outer circumferential spline teeth 5a of the input shaft 5.

The outer circumferential gear teeth of the second-level speed change gear 42 is provided, at the axially right end (facing the first-level speed change gear 41), with a chamfered portion C2 larger than a chamfered portion C1 that is provided at the axially left end (facing the second-level speed change gear 42) of the outer circumferential gear teeth of the first-level speed change gear 41. Specifically, the chamfered portion. C1 at the left end of the first-level speed change gear 41 is about one fourth to one third of a teeth height of the first-level speed change gear 41, whereas the chamfered portion C2 at the right end of the second-level speed change gear 42 is large enough to be about a half of a teeth height of the second-level speed change gear 42. The second-level speed change gear 42 is provided, at the left end, with a chamfered portion C3 that is smaller than the chamfered portion C2 at the right end and is about one fourth to one third of the teeth height of the second-level speed change gear 42.

The left end surface of the second-level speed change gear 42 and the right end surface of the third-level speed change gear 43 are flat surfaces perpendicular to the axis of the input shaft 5 so as to be in planar contact with each other. The left end surface of the second-level speed change gear 42 is flat and is thus provided with a recess inward in the radius direction than the remaining portion.

(Operation)

Shift operation will be described briefly. The first to third dog rings 51 to 53 are at neutral positions in the state depicted in FIG. 1. If the clutch 35 is disconnected and the gear shift pedal is pressed downward, for example, from this state, the shift cam drum 75 rotates by a predetermined rotation amount, the first shift folk 81 is shifted rightward by the first cam groove 71, the engagement projection 56 of the output first-level speed change gear 61 is engaged with the engagement hole 54 in the first dog ring 51, and the output first-level speed change gear 61 is power transmittably linked to the output shaft 6.

For shifting from the first speed level to the second speed level, the gear shift pedal is pressed upward (or downward) to further rotate the shift cam drum 75 by the predetermined rotation amount. The first dog ring 51 is shifted leftward and the engagement hole 54 in the first dog ring 51 is engaged with the engagement projection 56 of the output second-level speed change gear 62.

For shifting to the third or fourth speed level, the shift cam drum 75 is further rotated by the predetermined amount each to return the first dog ring 51 to the neutral position and then shift the second dog ring 52 rightward (for the third speed level) or leftward (for the fourth speed level).

For shifting to the fifth and sixth speed level, the shift cam drum 75 is further rotated by the predetermined amount each to return the second dog ring 52 to the neutral position and then shift the third dog ring 53 rightward (for the fifth speed level) or leftward (for the sixth speed level).

Effects of the Embodiment (1) The input first-level and second-level speed change gears 41 and 42 axially adjacent to each other on the input shaft 5 via the first predetermined space W1 therebetween are provided integrally with the input shaft 5. This structure reduces accumulative axial errors between the first-level and second-level speed change gears 41 and 42 during production and assembly, improves axial dimensional accuracy between the first-level and second-level speed change gears 41 and 42, and prevents axial displacement between the first-level and second-level speed change gears 41 and 42. According to the conventional technique disclosed in JP 2011-112197 A, the input second-level speed change gear is attached to the input shaft via a spline fitting portion and is thus hard to be reduced in diameter and hard to be increased in speed change ratio at the second speed level.

(2) In the dog ring speed changer depicted in FIGS. 1 and 2, the first dog ring 51 is disposed axially between the output first-level and second-level speed change gears 61 and 62 on the output shaft 6. The input first-level and second-level speed change gears 41 and 42 on the input shaft 5 meshing with the output first-level and second-level speed change gears 61 and 62 are thus disposed with the first predetermined space W1 therebetween in the axial direction. The first-level and second-level speed change gears 41 and 42 adjacent to each other on the input shaft 5 with the first predetermined space W1 being provided axially therebetween in the axial direction are provided integrally with the input shaft 5. Interference between the hob teeth A1 and the second-level speed change gear 42 is thus prevented while the first-level speed change gear 41 of the smaller diameter is gear cut. This facilitates provision of these two adjacent speed change gears 41 and 42 integrally with the input shaft 5.

(3) The two input speed change gears 41 and 42 are provided integrally with the single input shaft 5. This structure reduces the number of gear components. As compared to a structure in which a shaft and speed change gears provided thereto are formed separately, this structure prevents backlash, friction, and the like between the first-level and second-level speed change gears 41 and 42 and the input shaft 5.

(4) In the six speed change gears disposed on the input shaft 5, the first-level speed change gear 41 having the smallest diameter and the second-level speed change gear 42 having the second smallest diameter are provided integrally with the input shaft 5. This structure facilitates reduction in gear diameter and increase in speed change ratio between the first speed level and second speed level. This achieves improvement in acceleration of the vehicle.

(5) The second-level speed change gear 42 provided integrally with the input shaft 5 is not axially displaced from the input shaft 5. It is thus possible to set as small as possible the axial space between the input second-level speed change gear 42 and the input third-level speed change gear 43 disposed left next thereto. Accordingly, the second-level speed change gear 42 and/or the third-level speed change gear 43 can have large axial tooth widths and torque transmission capacity is increased between the input and output speed change gears at the second and/or third speed levels.

(6) The extending boss 43a extending toward the fourth-level speed change gear 44 is provided integrally with the input third-level speed change gear 43 at the inner circumferential end thereof. The axially left end of the extending boss 43a is in contact with the axial end of the inner circumferential end of the fourth-level speed change gear 44. Torque can be transmitted between the input shaft 5 and the third-level speed change gear 43 by the fourth-level speed change gear 44 so as to compensate limitation in axial length of the spline portion 43c of the third-level speed change gear 43. The extending boss 43a serves as a spacer between the third-level and fourth-level speed change gears 43 and 44. The axial space between the third-level and fourth-level speed change gears 43 and 44 can be regulated with no provision of a spacer separately from the speed change gears.

(7) The input third-level speed change gear 43 is fixed to the input shaft 5 in the rotation direction due to both of the spline fitting by the spline portion 43c and press fitting in the interference fitted state by the fitting portion 43d. This improves accuracy in attaching the third-level speed change gear 43 to the input shaft 5 and its joint degree. This structure improves torque transmission as compared to a structure in which a shaft is fixed only by spline fitting.

(8) The axial diameter D3 of the input shaft 5 in the first predetermined space W1 between the first-level and second-level speed change gears 41 and 42 provided integrally with the input shaft 5 is smaller than the major diameter D5 of the outer circumferential spline teeth 5a spline fitted to the third-level to sixth-level speed change gears 43 to 46. This achieves reduction in teeth tip circle diameter and increase in lower speed reduction ratio with no reduction in teeth height of the lower first-level and second-level speed change gears 41 and 42. Particularly in the present embodiment, the axial diameter D3 is small enough to be substantially equal to the minor diameter (teeth bottom circle diameter) D4 of the outer circumferential spline teeth 5a of the input shaft 5. This achieves reduction in gear diameter (teeth tip circle diameter) and increase in lower speed reduction ratio with no reduction in teeth height of the lower first-level and second-level speed change gears 41 and 42.

In other words, the teeth bottom circle diameters D1 and D2 of the first-level and second-level speed change gears 41 and 42 are reduced by reduction of the axial diameter D3 of the input shaft 5 in the first predetermined space W1. Teeth bottom radial heights H1 and H2 of the first-level and second-level speed change gears 41 and 42 are secured with respect to the outer circumferential surface of the input shaft 5 in the first predetermined space W1. This achieves increase in lower speed reduction ratio with not reduction of the teeth heights. Particularly in the present embodiment, the axial diameter D3 of the input shaft 5 is smaller than the minor diameter (teeth bottom circle diameter) D4 of the outer circumferential spline teeth 5a to achieve a large effect of increase in lower speed reduction ratio.

(9) The motorcycle gear-type speed changer depicted in the figures is a speed reducer configured to transmit power by reducing speed from the input shaft 5 to the output shaft 6 at each speed level from the first to sixth speed levels. Such a speed reducer achieves further reduction in diameter of the input first-level and second-level speed change gears 41 and 42 having small diameters as well as increase in lower speed reduction ratio to improve acceleration of the vehicle.

(10) The first-level speed change gear 41 on the input shaft 5 is disposed adjacent to the bearing 31 at the end of the shaft. This structure reduces torsion of the input shaft 5 that receives force from the first-level speed change gear 41 receiving large torque during operation.

(11) Regarding the shapes of the teeth roots of the lower first-level and second-level speed change gears 41 and 42 provided integrally with the input shaft 5, the left end surface of the first-level speed change gear 41 and the outer circumferential surface of the input shaft 5 are connected to each other in the arc shape by the first round surface R1 and the right end surface of the second-level speed change gear 42 and the outer circumferential surface of the input shaft 5 are connected to each other in the arc shape by the second round surface R2. The second round surface R2 is larger in radius than the first round surface R1. This improves rigidity of the second-level speed change gear 42 that is larger in gear diameter than the first-level speed change gear 41.

(12) The teeth bottom circle diameter D1 of the first-level speed change gear 41 is smaller than the major diameter (teeth tip circle diameter) D5 of the outer circumferential spline teeth 5a of the input shaft 5. Accordingly, the first-level speed change gear 41 is reduced in gear diameter and the speed change ratio is increased at the first speed level.

(13) The chamfered portion C2 provided at the end surface, facing the first-level speed change gear 41, of the outer circumferential gear teeth of the second-level speed change gear 42 is about one and a half times to twice as large as the chamfered portion C1 provided at the end surface, facing the second-level speed change gear 42, of the outer circumferential gear teeth of the first-level speed change gear 41. The hob teeth A1 is thus placed close to the second-level speed change gear 42 upon gear cutting the first-level speed change gear 41 having the small diameter to facilitate the gear cutting.

(14) The first dog ring 51 is disposed between the output first-level and second-level speed change gears 61 and 62. The input first-level and second-level speed change gears 41 and 42 meshing with the output first-level and second-level speed change gears 61 and 62 are thus disposed via the axial space therebetween. The input first-level and second-level speed change gears 41 and 42 can be disposed easily via the axial first predetermined space W1 therebetween.

(15) The output second-level and third-level speed change gears 62 and 63 meshing respectively with the input second-level and third-level speed change gears 42 and 43 are engaged with the different dog rings 51 and 52. The input second-level and third-level speed change gears 42 and 43 can be thus disposed axially close to each other.

(16) The chamfered portion C2 at the right end of the second-level speed change gear 42 is larger than the chamfered portion C1 at the left end of the first-level speed change gear 41 and the chamfered portion C3 at the left end of the second-level speed change gear 42. Interference between the second-level speed change gear 42 and a tool is thus prevented when the chamfered portion C2 of the second-level speed change gear 42 is formed before formation of the teeth of the first-level speed change gear 41. In contrast, a portion interfering with the tool for the first-level speed change gear 41 can be removed when the chamfered portion C2 of the second-level speed change gear 42 is formed after formation of the teeth of the first-level speed change gear 41.

(17) The chamfered portion C3 at the left end of the second-level speed change gear 42 is disposed outside an arc (corresponding to the outer diameter A2 of the hob teeth for gear cutting) extended in accordance with a curvature at the right end of the spline groove in the input shaft 5. Interference between the second-level speed change gear 42 and the tool is thus prevented when the chamfered portion C3 of the second-level speed change gear 42 is formed before formation of the spline teeth 5a. In contrast, interference between the second-level speed change gear 42 and the tool is prevented when the chamfered portion C3 of the second-level speed change gear 42 is formed after formation of the spline teeth 5a. The portion interfering with the tool for the spline teeth 5a can be removed when the chamfered portion C2 of the second-level speed change gear 42 is formed after formation of the teeth of the first-level speed change gear 41.

(18) There is no need to dispose any spacer between the first-level and second-level speed change gears 41 and 42 provided integrally with the input shaft 5. This structure requires no processing of disposing any spacer. Specifically, as compared to the right end surface of the first-level speed change gear 41, the left end surface of the first-level speed change gear 41 and the right end surface of the second-level speed change gear 42 can be provided continuously to the input shaft 5 in the arc shapes with respect to the axis.

Other Embodiments (1) The gear-type speed changer according to the embodiment described above is a speed reducer configured to transmit power from the input shaft to the output shaft by reducing speed at each speed level. The present invention is also applicable to a speed changer configured to transmit power from an input shaft to an output shaft by increasing speed. In this case, the adjacent ones of the output speed change gears on the output shaft are provided integrally with the output shaft and the dog ring is disposed between the two input speed change gears meshing with the adjacent output speed change gears. Such a speed increaser can be exemplified by a speed increaser configured to change an increased speed change ratio in order to increase speed of power of a vehicle engine and utilize the power for driving a supercharger.

(2) The input first-level and second-level speed change gears are provided integrally with the input shaft in the above embodiment. Alternatively, the two input speed change gears for a different speed level (e.g. for not less than the third speed level) meshing with the two output speed change gears adjacent to each other via a dog ring can be provided integrally with the input shaft. In a case where the dog ring is disposed on the input shaft, the two output adjacent speed change gears are to be provided integrally with the output shaft.

(3) The two adjacent speed change gears provided integrally with the shaft are preferred to be on the input shaft and be smaller in outer diameter in order to set a large speed change ratio. The output speed change gears having small outer diameter are preferably provided integrally with the shaft in order to set a small speed change ratio. Alternatively, a speed change gear required to be most accurate among the plurality of speed change gears can be provided integrally with the shaft.

(4) In the above embodiment, the speed change gear at the axial end of the input shaft and the speed change gear adjacent thereto are provided integrally with the input shaft. The present invention is not limited to the speed change gears at the axial end but any of the speed change gears disposed not at the axial end can be alternatively provided integrally with the shaft.

(5) The plurality of speed change gears are axially aligned such that the speed change gears have speed change ratios gradually varied from one of the axial ends to the other axial end in the above embodiment. The present invention is not limited to such gear alignment. For example, in order to improve accuracy at the third speed level and the fourth speed level out of the six speed levels, the output third-level and fourth-level speed change gears are disposed adjacent to each other via a dog ring, the input third-level and fourth-level speed change gears meshing with the output third-level and fourth-level speed change gears are provided integrally with the input shaft and the remaining input speed change gears are spline fitted to the input shaft.

(6) All the members axially shiftable on the output shaft are provided as the dog rings in the above embodiment. Alternatively, a shift structure provided with a dog ring and a shift structure provided with a shift sleeve having speed change gear teeth can be provided together.

(7) In the relation between the outer diameter of the first hob teeth A1 and the first predetermined space W1 in the above embodiment, the first predetermined space W1 is set so that the first hob teeth A1 is displaced slightly rightward from the position where the first hob teeth A1 start interfering with the right end of the second-level speed change gear 42 upon completion of gear cutting at the left end of the first-level speed change gear 41 in the gear cutting of the first-level speed change gear 41. The present invention is not limited to this case, but the first hob teeth can have a smaller diameter.

Similarly, in the relation between the outer diameter of the second hob teeth A2 and the second predetermined space W2, the second predetermined space W2 is set so that the second hob teeth A2 is displaced slightly leftward from the position where the second hob teeth A2 interfere with the left end of the second-level speed change gear 42 upon completion of processing at the right end of the outer circumferential spline teeth 5a in the gear cutting of the outer circumferential spline teeth 5a of the input shaft 5 with the second hob teeth A2. The present invention is not limited to this case, but the second hob teeth can have a smaller diameter.

(8) There is no need to dispose any spacer between the first-level and second-level speed change gears 41 and 42 provided integrally with the input shaft 5. This structure requires no processing of disposing any spacer. Specifically, as compared to the right end surface of the first-level speed change gear 41, the left end surface of the first-level speed change gear 41 and the right end surface of the second-level speed change gear 42 can be provided continuously to the input shaft 5 in the arc shapes with respect to the axis.

(9) The present invention is applicable to a motor vehicle in addition to a vehicle driven by an engine (internal combustion engine).

(10) The present invention is applicable to a vehicle in addition to the motorcycle.

(11) The gear-type speed changer according to the present invention is not limited to the speed changer with the six speed levels as in the above embodiment, but can adopt two to five speed levels as well as seven or more speed levels, if the speed changer includes a shaft integrally provided with at least two speed change gears.

(12) The present invention also includes a speed changer provided with the speed change gears axially aligned reversely in the transverse direction to the alignment depicted in FIGS. 1 and 2.

(13) The present invention can include various modifications and changes without departing from the spirit and the scope of the present invention recited in the following claims.

What is claimed is:

1. A vehicle gear speed changer comprising:
an input shaft including a plurality of input speed change gears; and
an output shaft including a plurality of output speed change gears meshing with the plurality of input speed change gears and disposed in parallel to the input shaft, wherein
out of the plurality of speed change gears on a first one of the input shaft and the output shaft, two of the speed change gears are disposed adjacent to each other via an axial space therebetween and are axially fixed and rotatably fitted around the first shaft, and a dog ring for a dog clutch, disposed between the two adjacent speed change gears, is fixed around the first shaft and axially slidably fitted thereto,
the two adjacent speed change gears and the dog ring on the first shaft are each provided with an engagement portion for engaging and disengaging the dog clutch by axial shift of the dog ring,
the two speed change gears on a second one of the shafts, meshing with the two speed change gears on the first shaft, are integrally formed with the second shaft as a one-piece construction,
the speed change gears meshing with each other form at least three speed change gear pairs,
out of the speed change gear pairs, the second shaft is integrally provided with a first speed change gear disposed on the second shaft and forming a first speed change gear pair with a largest speed change ratio, and a second speed change gear disposed on the second shaft and forming a second speed change gear pair with a second largest speed change ratio,
the speed change gear disposed on the second shaft and forming the remaining speed change gear pair is spline fitted to an outer circumferential surface of the second shaft,
a third speed change gear is disposed opposite to the first speed change gear with respect to the second speed change gear,
the third speed change gear is spline fitted to the outer circumferential surface of the second shaft and has an axially end surface at an inner circumferential end, and the axially end surface is axially in contact with a teeth root of the second speed change gear, and
the third speed change gear has an inner circumferential surface including a spline portion spline fitted to the second shaft and a fitting portion interference fitted to the outer circumferential surface, not provided with the spline portion, of the second shaft.

2. The vehicle gear speed changer according to claim 1, wherein
a fourth speed change gear is disposed opposite to the second speed change gear with respect to the third speed change gear, and
the fourth speed change gear is spline fitted to the outer circumferential surface of the second shaft and has an axially end surface at an inner circumferential end, and the axially end surface is axially in contact with the inner circumferential end of the third speed change gear.

3. A motorcycle speed reducer comprising the vehicle gear speed changer according to claim 1, wherein
the motorcycle speed reducer has at least three speed levels,
the second shaft corresponds to the input shaft configured to receive power from a rotation drive source,
the first shaft corresponds to the output shaft configured to transmit the power to a driving wheel, and
the two speed change gears provided integrally with the input shaft are lower first-level and second-level speed change gears.

4. A vehicle gear speed changer comprising:
an input shaft including a plurality of input speed change gears; and
an output shaft including a plurality of output speed change gears meshing with the plurality of input speed change gears and disposed in parallel to the input shaft, wherein
out of the plurality of speed change gears on a first one of the input shaft and the output shaft, two of the speed change gears are disposed adjacent to each other via an axial space therebetween and are axially fixed and rotatably fitted around the first shaft, and a dog ring for a dog clutch, disposed between the two adjacent speed change gears, is fixed around the first shaft and axially slidably fitted thereto,
the two adjacent speed change gears and the dog ring on the first shaft are each provided with an engagement portion for engaging and disengaging the dog clutch by axial shift of the dog ring,
the two speed change gears on a second one of the shafts, meshing with the two speed change gears on the first shaft, are integrally formed with the second shaft as a one-piece construction,
the speed change gears meshing with each other form at least three speed change gear pairs,
out of the speed change gear pairs, the second shaft is integrally provided with a first speed change gear disposed on the second shaft and forming a first speed change gear pair with a largest speed change ratio, and a second speed change gear disposed on the second shaft and forming a second speed change gear pair with a second largest speed change ratio, the speed change gear disposed on the second shaft and forming the remaining speed change gear pair is spline fitted to an outer circumferential surface of the second shaft, a third speed change gear is disposed opposite to the first speed change gear with respect to the second speed change gear, the third speed change gear is spline fitted to the outer circumferential surface of the second shaft and has an axially end surface at an inner circumferential end, and the axially end surface is axially in contact with a teeth root of the second speed change gear, and the second shaft has a portion between the first speed change gear and the second speed change gear, and the portion has an axial diameter smaller than a major diameter of outer circumferential spline teeth of the second shaft spline fitted to the third speed change gear.

5. A vehicle gear speed changer comprising:

an input shaft including a plurality of input speed change gears; and an output shaft including a plurality of output speed change gears meshing with the plurality of input speed change gears and disposed in parallel to the input shaft, wherein out of the plurality of speed change gears on a first one of the input shaft and the output shaft, two of the speed change gears are disposed adjacent to each other via an axial space therebetween and are axially fixed and rotatably fitted around the first shaft, and a dog ring for a dog clutch, disposed between the two adjacent speed change gears, is fixed around the first shaft and axially slidably fitted thereto, the two adjacent speed change gears and the dog ring on the first shaft are each provided with an engagement portion for engaging and disengaging the dog clutch by axial shift of the dog ring, the two speed change gears on a second one of the shafts, meshing with the two speed change gears on the first shaft, are provided integrally with the second shaft, the speed change gears meshing with each other form at least three speed change gear pairs, out of the speed change gear pairs, the second shaft is integrally provided with a first speed change gear disposed on the second shaft and forming a first speed change gear pair with a largest speed change ratio, and a second speed change gear disposed on the second shaft and forming a second speed change gear pair with a second largest speed change ratio, the speed change gear disposed on the second shaft and forming the remaining speed change gear pair is spline fitted to an outer circumferential surface of the second shaft, a third speed change gear is disposed opposite to the first speed change gear with respect to the second speed change gear, the third speed change gear is spline fitted to the outer circumferential surface of the second shaft and has an axially end surface at an inner circumferential end, and the axially end surface is axially in contact with a teeth root of the second speed change gear, and the third speed change gear has an inner circumferential surface including a spline portion spline fitted to the second shaft and a fitting portion interference fitted to the outer circumferential surface, not provided with the spline portion, of the second shaft.

6. A vehicle gear speed changer comprising:

an input shaft including a plurality of input speed change gears; and an output shaft including a plurality of output speed change gears meshing with the plurality of input speed change gears and disposed in parallel to the input shaft, wherein out of the plurality of speed change gears on a first one of the input shaft and the output shaft, two of the speed change gears are disposed adjacent to each other via an axial space therebetween and are axially fixed and rotatably fitted around the first shaft, and a dog ring for a dog clutch, disposed between the two adjacent speed change gears, is fixed around the first shaft and axially slidably fitted thereto, the two adjacent speed change gears and the dog ring on the first shaft are each provided with an engagement portion for engaging and disengaging the dog clutch by axial shift of the dog ring, the two speed change gears on a second one of the shafts, meshing with the two speed change gears on the first shaft, are provided integrally with the second shaft, the speed change gears meshing with each other form at least three speed change gear pairs, out of the speed change gear pairs, the second shaft is integrally provided with a first speed change gear disposed on the second shaft and forming a first speed change gear pair with a largest speed change ratio, and a second speed change gear disposed on the second shaft and forming a second speed change gear pair with a second largest speed change ratio, the speed change gear disposed on the second shaft and forming the remaining speed change gear pair is spline fitted to an outer circumferential surface of the second shaft, a third speed change gear is disposed opposite to the first speed change gear with respect to the second speed change gear, the third speed change gear is spline fitted to the outer circumferential surface of the second shaft and has an axially end surface at an inner circumferential end, and the axially end surface is axially in contact with a teeth root of the second speed change gear, and the second shaft has a portion between the first speed change gear and the second speed change gear, and the portion has an axial diameter smaller than a major diameter of outer circumferential spline teeth of the second shaft spline fitted to the third speed change gear.

* * * * *